(12) United States Patent
Abreu

(10) Patent No.: US 10,935,003 B2
(45) Date of Patent: Mar. 2, 2021

(54) LUBRICATION SYSTEM FOR A MAIN BEARING OF A WIND TURBINE

(71) Applicant: General Electric Company, Schenectady, NY (US)

(72) Inventor: Christopher Rene Abreu, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 420 days.

(21) Appl. No.: 15/800,670

(22) Filed: Nov. 1, 2017

(65) Prior Publication Data
US 2019/0128244 A1 May 2, 2019

(51) Int. Cl.
| | |
|---|---|
| *F03D 80/70* | (2016.01) |
| *F16C 19/28* | (2006.01) |
| *F16C 33/66* | (2006.01) |
| *F16N 13/10* | (2006.01) |
| *F16N 13/00* | (2006.01) |
| *F16C 19/26* | (2006.01) |
| *F16C 19/54* | (2006.01) |

(52) U.S. Cl.
CPC .............. *F03D 80/70* (2016.05); *F16C 19/28* (2013.01); *F16C 33/6659* (2013.01); *F16C 33/6685* (2013.01); *F16N 13/10* (2013.01); *F05B 2240/50* (2013.01); *F05B 2240/54* (2013.01); *F05B 2240/57* (2013.01); *F05B 2240/60* (2013.01); *F05B 2260/4031* (2013.01); *F05B 2260/98* (2013.01); *F16C 19/26* (2013.01); *F16C 19/54* (2013.01); *F16C 2360/31* (2013.01); *F16N 13/00* (2013.01); *F16N 2210/025* (2013.01)

(58) Field of Classification Search
CPC ...... F03D 80/70; F16C 19/28; F16C 33/6659; F16C 33/6685; F16N 13/10
See application file for complete search history.

(56) References Cited

U.S. PATENT DOCUMENTS 3,753,604 A * 8/1973 Arsenius ............. F16C 32/0644
384/110
4,942,944 A * 7/1990 Frey .................... F16C 33/6677
184/27.1

(Continued)

FOREIGN PATENT DOCUMENTS

| CN | 201 367 988 Y | 12/2009 |
| CN | 201 714 592 U | 1/2011 |
| CN | 202 901 241 U | 4/2013 |

OTHER PUBLICATIONS

CN202901241—Machine Translation (Year: 2013).*
European Search Report, dated Mar. 21, 2019.

*Primary Examiner* — Michael A Riegelman
(74) *Attorney, Agent, or Firm* — Dority & Manning, P.A.

(57) ABSTRACT

A lubrication system for a main bearing positioned around a main shaft of a wind turbine includes a seal ring positioned around the shaft adjacent to the bearing, at least one gear adjacent to the seal ring, a mechanical lubricant pump arranged to engage the at least one gear, and at least one lubricant for providing lubrication to the bearing. Thus, as the shaft rotates, the gear(s) drives the lubricant pump such that the pump continuously provides the lubricant to the bearing so long as the shaft is rotating.

7 Claims, 7 Drawing Sheets

(56) References Cited

U.S. PATENT DOCUMENTS

| | | | |
|---|---|---|---|
| 6,790,156 B2* | 9/2004 | Hosle | F16H 1/227 475/331 |
| 2005/0051387 A1* | 3/2005 | Flamang | F16H 57/043 184/6.12 |
| 2010/0007151 A1* | 1/2010 | Ciszak | F16H 57/043 290/55 |
| 2011/0188988 A1* | 8/2011 | Wadehn | F16C 32/0644 415/1 |
| 2011/0222804 A1* | 9/2011 | Okano | F16C 19/52 384/471 |
| 2011/0235953 A1* | 9/2011 | Wheals | F03D 80/70 384/100 |
| 2012/0070280 A1* | 3/2012 | Wadehn | F03D 7/0224 416/1 |
| 2012/0114488 A1* | 5/2012 | Giger | F03D 80/70 416/170 R |
| 2012/0134808 A1* | 5/2012 | Lindberg | F03D 80/70 416/1 |
| 2012/0157256 A1* | 6/2012 | Takeuchi | F16H 57/0479 475/159 |
| 2012/0237152 A1* | 9/2012 | Wheals | F16C 25/06 384/548 |
| 2012/0256426 A1* | 10/2012 | Klein | F03D 80/70 290/1 C |
| 2013/0172144 A1* | 7/2013 | Suzuki | F03D 80/70 475/159 |
| 2013/0280039 A1* | 10/2013 | Pasteuning | F03D 80/70 415/111 |
| 2019/0128244 A1* | 5/2019 | Abreu | F16C 33/6685 |
| 2019/0136831 A1* | 5/2019 | Abreu | F03D 80/70 |
| 2019/0257294 A1* | 8/2019 | Abreu | F03D 1/0691 |

* cited by examiner

LUBRICATION SYSTEM FOR A MAIN BEARING OF A WIND TURBINE

FIELD

The present subject matter relates generally to wind turbines, and more particularly to a lubrication system for a main bearing of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate member support frame located within the nacelle. More specifically, in many wind turbines, the gearbox is mounted to the bedplate member via one or more torque supports or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to electrical generators. The wind turns the rotor blades, which spin a low speed shaft, i.e. the main shaft. Rotation of the main shaft is provided by a main bearing. The main shaft is coupled to an input shaft of the gearbox, which has a higher speed output shaft connected to the generator. Thus, the geared drivetrain aims to increase the velocity of the mechanical motion.

Lubrication of the main bearing can be a challenge as reliable or constant lubrication is required during all operating conditions in order for the main bearing to remain operational. For example, electrically-driven lubrication systems have inherent reliability issues (i.e. electric power is required for operation). Thus, if the electrically-driven lubrication system stops working due to a loss of power, the wind turbine must be shut down as proper lubrication will not be provided.

Thus, the art is continuously seeking new and improved systems and methods for providing lubrication to the main bearing. Accordingly, the present disclosure is directed to a lubrication system for a main bearing of a wind turbine that utilizes a mechanical pump driven by a gear that rotates with the main shaft.

BRIEF DESCRIPTION

Aspects and advantages of the invention will be set forth in part in the following description, or may be obvious from the description, or may be learned through practice of the invention.

In one aspect, the present disclosure is directed to a lubrication system for a bearing positioned around a shaft. The lubrication system includes a seal ring positioned around the shaft adjacent to the bearing, at least one gear adjacent to the seal ring, a lubricant pump arranged to engage the gear(s), and at least one lubricant for providing lubrication to the bearing. Thus, as the shaft rotates, the gear(s) drives the lubricant pump such that the pump continuously provides the lubricant to the bearing so long as the shaft is rotating.

In one embodiment, the gear(s) may be a separate component mounted to the shaft. In alternative embodiments, the lubrication system may include a seal ring positioned around the shaft adjacent to the bearing. In such embodiments, the seal ring may include gear formed therein.

In another embodiment, the lubricant pump may be a mechanical pump. More specifically, in such embodiments, the mechanical pump may include a positive displacement pump.

In further embodiments, the lubrication system may include a collection system arranged with the lubricant pump and the bearing. As such, the collection system is configured to collect excess lubricant of the lubrication system. More specifically, in one embodiment, the collection system may include any suitable configuration of piping, drains, and/or sumps.

In additional embodiments, the bearing may correspond to a main bearing of a wind turbine, whereas the shaft may correspond to a main shaft of the wind turbine. In such embodiments, as the main shaft rotates via the wind, the lubricant is delivered to the main bearing via the lubricant pump.

In several embodiments, the bearing may be any suitable type of bearing, including but not limited to a tapered roller bearing, a spherical roller bearing, or a cylindrical roller bearing.

In another aspect, the present disclosure is directed to a method for lubricating a bearing positioned around a shaft. The method includes providing a seal ring around the shaft and adjacent to the bearing. The method also includes arranging at least one gear with the seal ring. Further, the method includes engaging a lubricant pump with the gear(s). The method also includes rotating the shaft. Thus, as the shaft rotates, the gear(s) drives the lubricant pump such that the pump continuously provides lubricant to the bearing so long as the shaft is rotating. It should be understood that the method may also include any of the additional steps and/or features as described herein.

In yet another aspect, the present disclosure is directed to a drivetrain assembly for a wind turbine. The drivetrain assembly includes a main shaft, a main bearing having an inner race, an outer race, and a plurality of roller elements configured therebetween, and a lubrication system for providing lubrication to the main bearing. The lubrication system includes at least one gear arranged with the main shaft, a lubricant pump arranged to engage the gear(s), and at least one lubricant for providing lubrication to the main bearing. Thus, as the main shaft rotates, the gear(s) drives the lubricant pump such that the pump continuously provides the lubricant to the main bearing so long as the main shaft is rotating. It should be understood that the drivetrain assembly may further include any of the additional features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
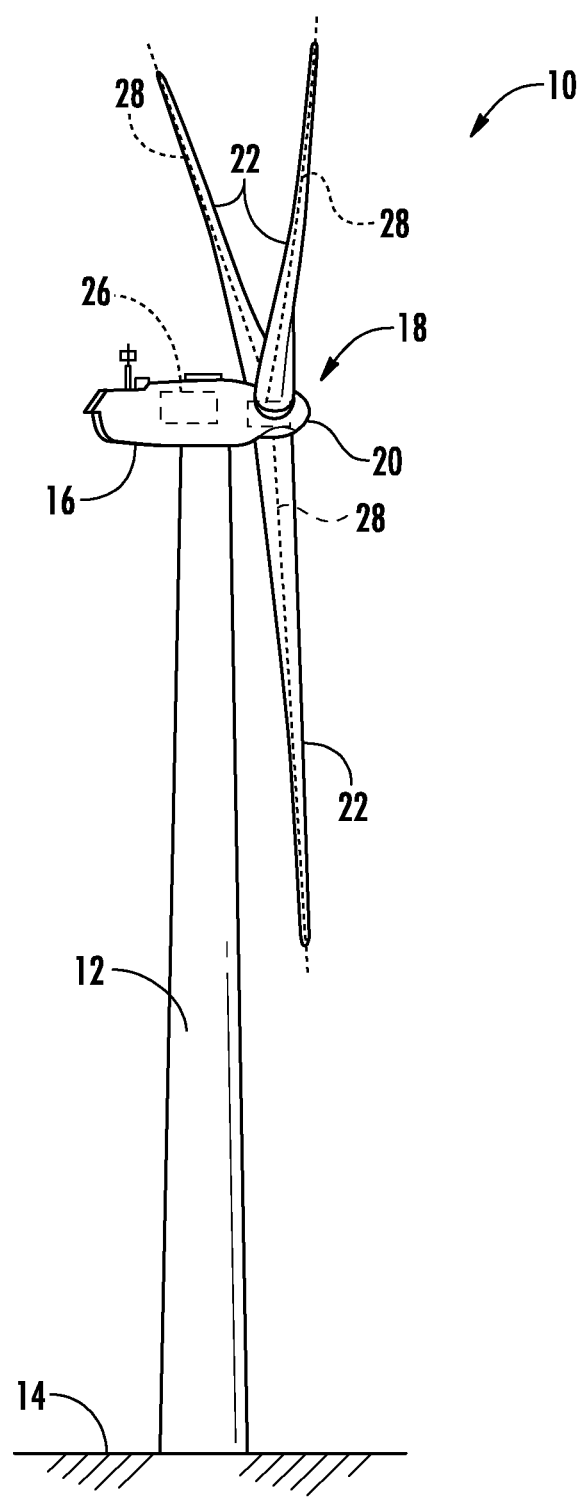
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
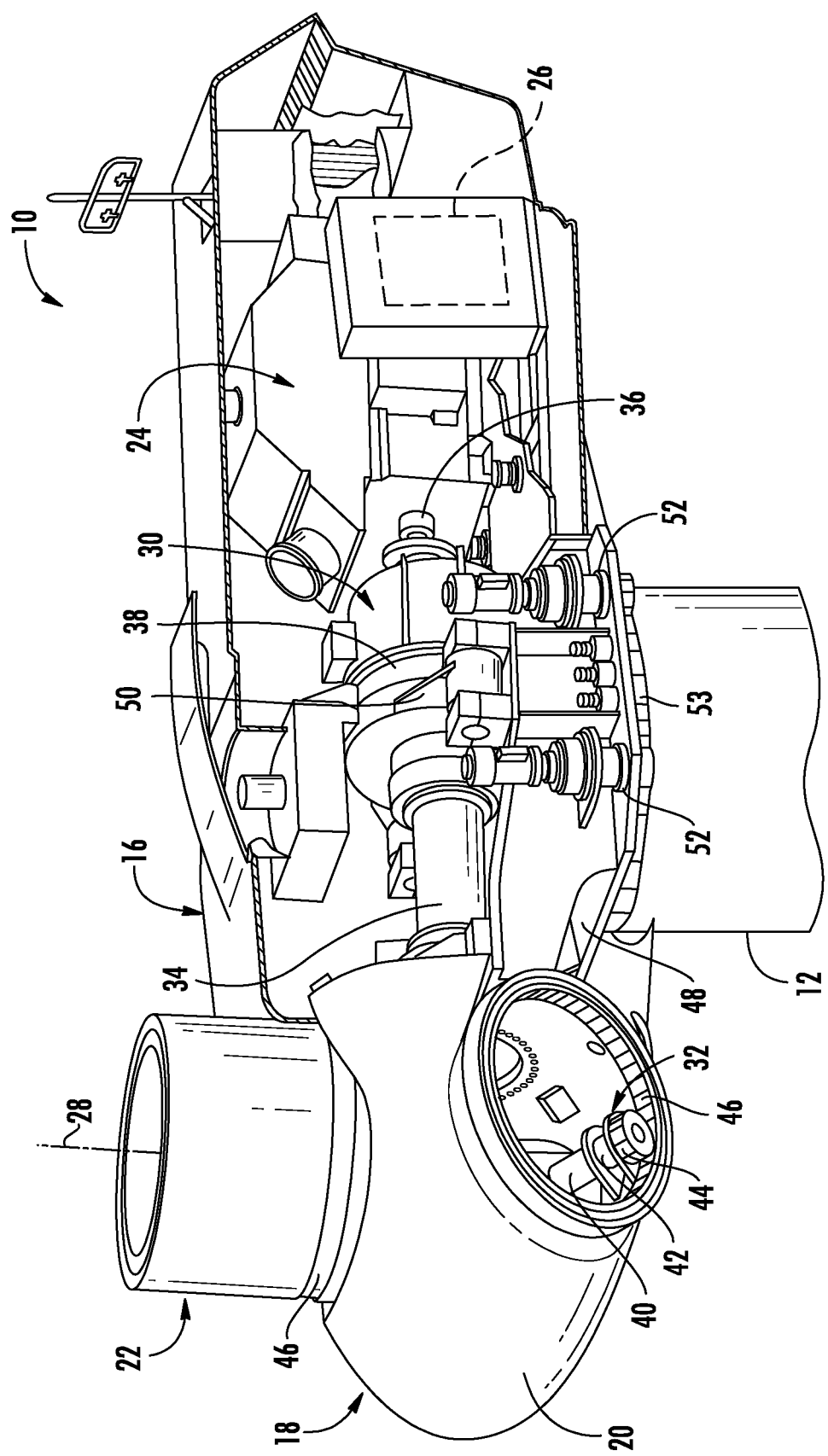
FIG. 2 illustrates a perspective view of a simplified, internal view of one embodiment of a nacelle of a wind turbine according to the present disclosure, particularly illustrating a drivetrain assembly having a single main bearing unit.
Figure 3:
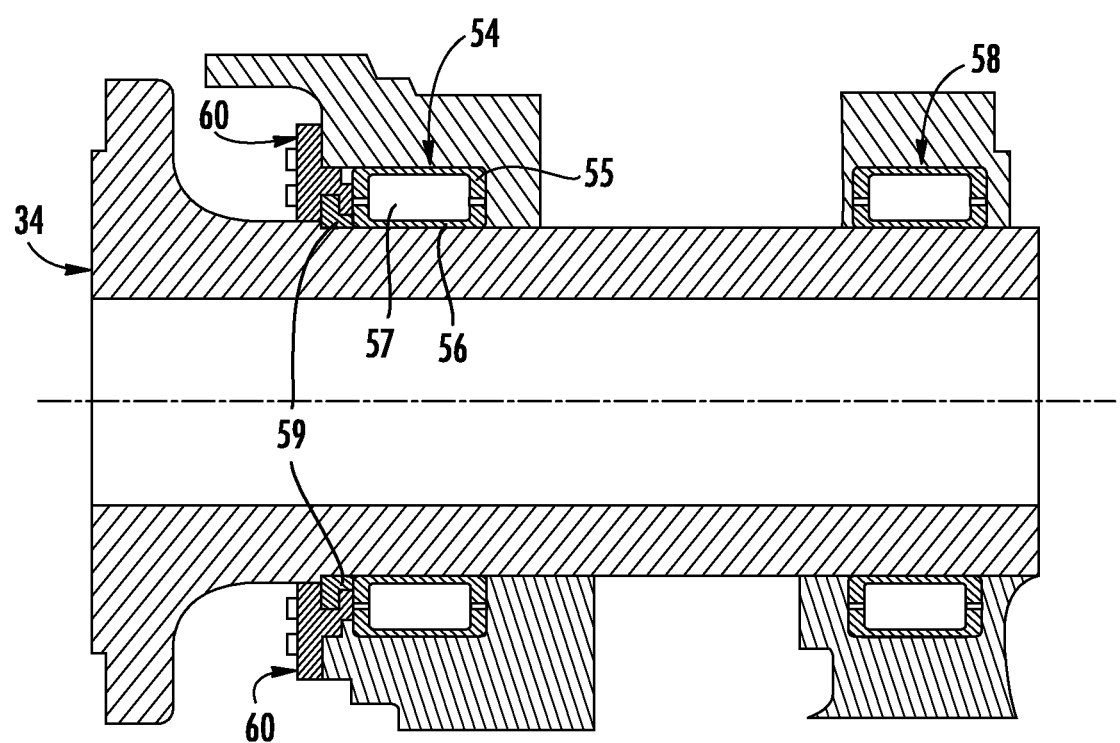
FIG. 3 illustrates a cross-sectional view of one embodiment of certain drivetrain components of a wind turbine according to the present disclosure, particularly illustrating a drivetrain assembly having a main shaft and a main bearing mounted thereon.

Referring now to FIGS. 2 and 3, various views of the drivetrain assembly of a wind turbine, such as the wind turbine 10 of FIG. 1, are illustrated. FIG. 2 illustrates a simplified, internal view of one embodiment of the nacelle 16 of the wind turbine 10 shown in FIG. 1, particularly illustrating certain drivetrain components of a drivetrain assembly having a single main bearing unit. FIG. 3 illustrates a cross-sectional view of one embodiment of several drivetrain components of a drivetrain assembly of the wind turbine 10 according to the present disclosure. As shown in FIG. 2, the generator 24 may be coupled to the rotor 18 for producing electrical power from the rotational energy generated by the rotor 18. Further, as shown in FIGS. 2 and 3, the rotor 18 may include a main shaft 34 rotatable via a main bearing 54 coupled to the hub 20 for rotation therewith. The main shaft 34 may, in turn, be rotatably coupled to a gearbox output shaft 36 of the generator 24 through a gearbox 30. More specifically, as shown in FIG. 3, the main shaft 34 is typically supported by one or more bearings 54, 58. For example, as shown, a upwind end of the shaft 34 may be supported by a first or main bearing 54 and a downwind end of the shaft 34 may be supported by a second bearing 58. More specifically, as shown, the main bearing 54 generally corresponds to a cylindrical roller bearing having an inner race 56, an outer race 55, and a plurality of roller elements 57 arranged therebetween. In further embodiments, the main bearing 54 may be any suitable bearing in addition to cylindrical roller bearings, including for example, a tapered rolling bearing, a spherical roller bearing, or any other suitable bearing. In addition, as shown, the main bearing 54 may be secured in place via a bearing cover 60 that is mounted at the upwind end of the shaft 34, as well as a seal ring 59 configured between the cover 60 and the main bearing 54. For example, in certain embodiments, the seal ring 59 may correspond to a labyrinth seal that prevents leakage of bearing fluids. Further, as shown, the bearings 54, 58 may be mounted to the bedplate member 48 of the nacelle 16 via one or more torque supports 50.

Referring back to FIG. 2, the gearbox 30 may include a gearbox housing 38 that is connected to the bedplate 48 by one or more torque arms 50. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 52 communicatively coupled to the controller 26, with each yaw drive mechanism(s) 52 being configured to change the angle of the nacelle 16 relative to the wind (e.g., by engaging a yaw bearing 53 of the wind turbine 10).

Figure 4:
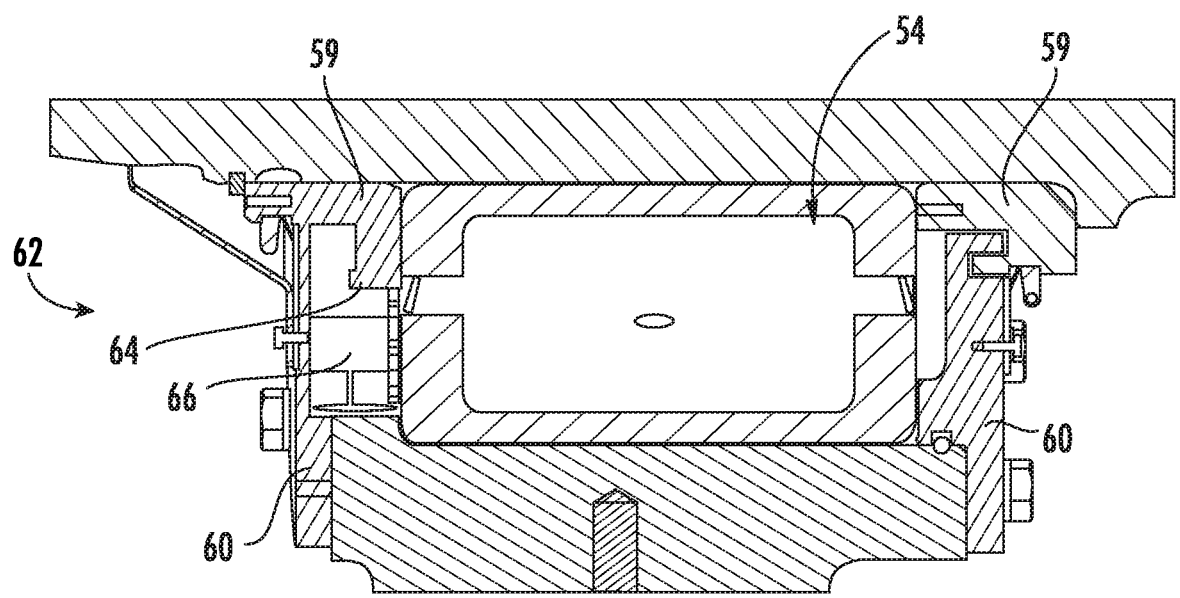
FIG. 4 illustrates a detailed cross-sectional view of one embodiment of the main bearing according to the present disclosure, particularly illustrating a lubrication system arranged with the main bearing.
Figure 5:
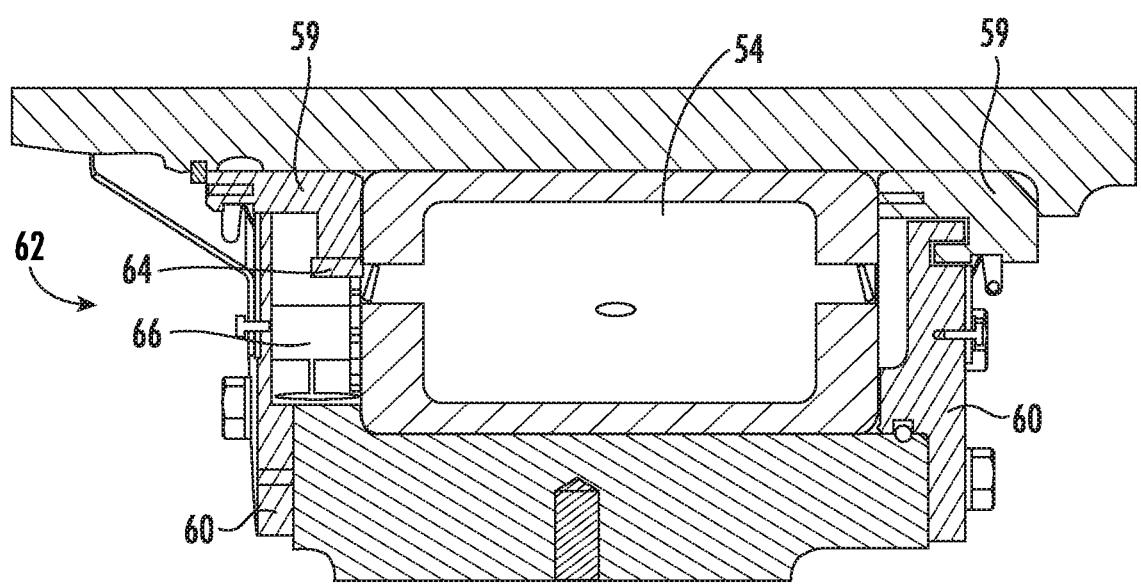
FIG. 5 illustrates a detailed cross-sectional view of another embodiment of the main bearing according to the present disclosure, particularly illustrating a lubrication system arranged with the main bearing.
Figure 6:
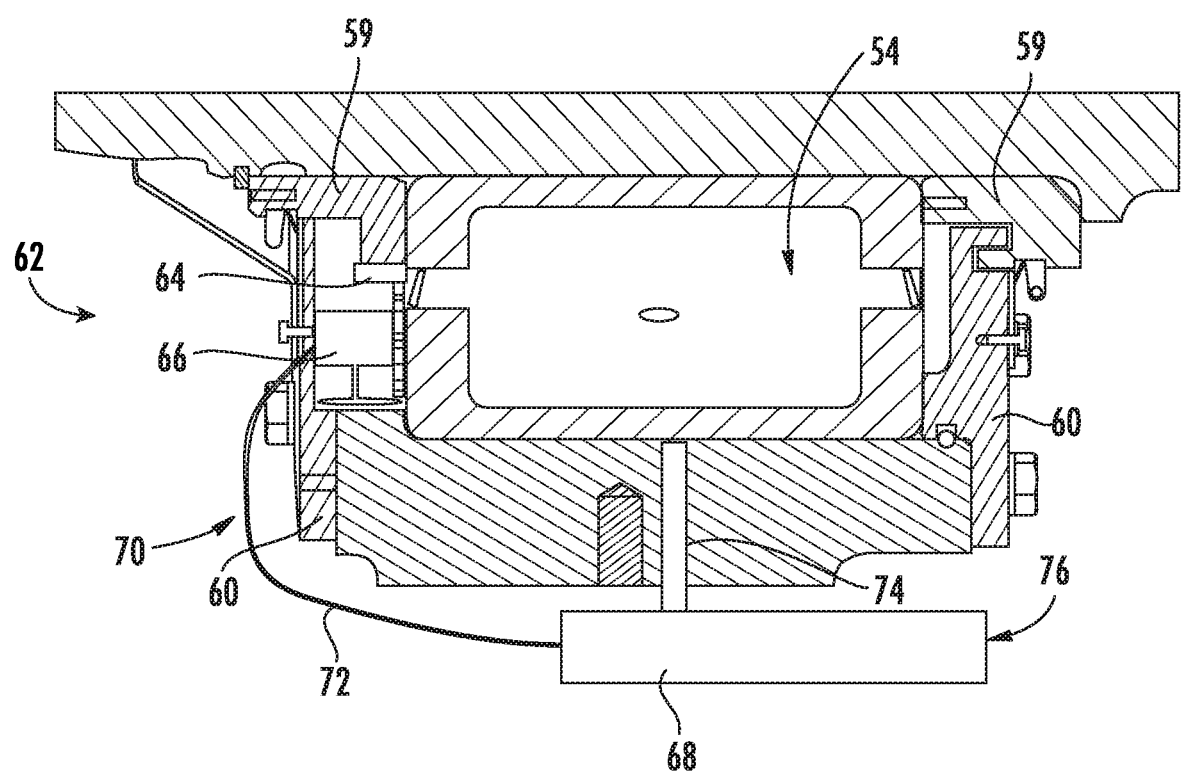
FIG. 6 illustrates a detailed cross-sectional view of yet another embodiment of the main bearing according to the present disclosure, particularly illustrating a lubrication system arranged with the main bearing and having a collection system.

Referring now to FIGS. 4-6, various views of a lubrication system 62 for lubricating the main bearing 54 of the wind turbine 10 are illustrated. FIG. 4 illustrates a detailed, cross-sectional view of one embodiment of the lubrication system 62 installed with the main bearing 54 according to the present disclosure. FIG. 5 illustrates a detailed, cross-sectional view of another embodiment of the lubrication system 62 installed with the main bearing 54 according to the present disclosure, particularly illustrating a collection system 70 of the lubrication system 62.

More particularly, as shown, the lubrication system 62 includes the seal ring 59 which, as mentioned, is positioned around the main shaft 34 adjacent to the main bearing 54, at least one gear 64 adjacent to the seal ring 59, a lubricant pump 66 arranged to engage the gear(s) 64, and at least one lubricant 68 (FIG. 6) for providing lubrication to the main bearing 54. Thus, as the main shaft 34 rotates, the gear(s) 64 drives the lubricant pump 66 such that the pump 66 continuously provides the lubricant 68 to the main bearing 54 so long as the main shaft 34 is rotating.

In one embodiment, as shown in FIG. 4, the seal ring 59 described herein may include the gear(s) 64 formed therein. In such embodiments, the gear(s) 64 may be machined into the seal ring 59 using any suitable machining process. In alternative embodiments, as shown in FIG. 5, the gear(s) 64 may be a separate component mounted to the main shaft 34. In such embodiments, the gear(s) 64 may be plastic or steel gears (or any other suitable material having a strength and/or hardness) that are mounted such that the gear(s) 64 mesh with the lubricant pump 66.

In several embodiments, the lubricant pump 66 of the lubrication system 62 corresponds to a mechanical pump. More specifically, in such embodiments, the mechanical pump may include a positive displacement pump or any other suitable pump that can be drive by the rotating gear(s) 64. In such embodiments, as the main shaft 34 rotates, e.g. via the wind, the lubricant 68 is delivered to the main bearing 54 via the lubricant pump 66. As such, the lubricant pump 66 may be positioned adjacent to the seal ring 59 of the main bearing 54 such that the pump 66 may engage the gear(s) 64. Thus, in some embodiments, the cover 60 of the main bearing 54 may need to be machined so as to accommodate the pump 66. Once machined, the pump 66 may be positioned in place and the cover 60 may be replaced so as to maintain engagement of the pump 66 with the gear(s) 64.

Referring particularly to FIG. 6, the lubrication system 62 may also include a collection system 70 arranged with the lubricant pump 66 and the main bearing 54. As such, the collection system 70 is configured to collect excess lubricant of the lubrication system 62. More specifically, as shown, the collection system 70 may include any suitable configuration of piping 72, drains 74, and/or sumps 76.

Figure 7:
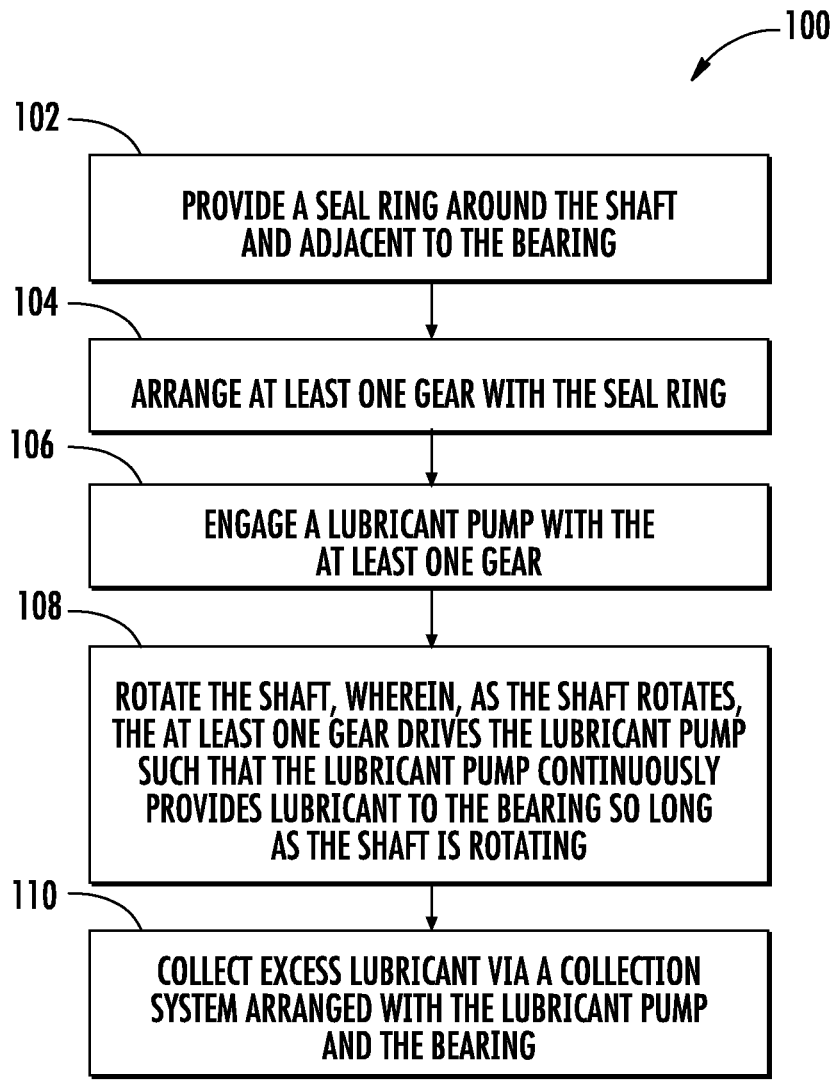
FIG. 7 illustrates a flow diagram of one embodiment of a method for lubricating a main bearing of a wind turbine according to the present disclosure.

Referring now to FIG. 7, a flow diagram of one embodiment of a method 100 lubricating a bearing positioned around a shaft is illustrated. Though the bearing may include the main bearing 54 of the wind turbine 10 described herein, it should be understood that the method 100 may be applied to any bearing that rotates around shaft and therefore needs lubrication, including further wind turbine bearings and those bearings outside of wind turbine applications. As shown at 102, the method 100 includes providing a seal ring around the shaft and adjacent to the bearing. As shown at 104, the method includes arranging at least one gear with the seal ring. More specifically, in one embodiment, the step of arranging the gear(s) on the shaft may include mounting the gear(s) to the shaft. In alternatively embodiments, the step arranging the gear(s) on the shaft may include securing a seal ring around the shaft adjacent to the bearing. In such embodiments, the seal ring may have the gear(s) formed therein.

As shown at 106, the method 100 includes engaging a lubricant pump with the gear(s). For example, as mentioned, the lubricant pump may correspond to a mechanical pump that engages the gear(s). As shown at 108, the method 100 includes rotating the shaft. Thus, as the shaft rotates, the gear(s) drives the lubricant pump such that the pump continuously provides lubricant to the bearing so long as the shaft is rotating.

In further embodiments, as shown at 110, the method 100 may further include collecting excess lubricant via a collection system arranged with the lubricant pump and the bearing. In such embodiments, the collected lubricant may be stored and/or reused.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A lubrication system for a bearing positioned around a shaft, the lubrication system comprising:
   a seal ring positioned circumferentially around the shaft adjacent to the bearing;
   at least one gear arranged adjacent to and contacting the seal ring, the at least one gear being a separate component mounted directly to the seal ring;
   a lubricant pump arranged to engage the at least one gear; and,
   at least one lubricant for providing lubrication to the bearing,
   wherein, as the shaft rotates, the at least one gear drives the lubricant pump such that the lubricant pump continuously provides the lubricant to the bearing so long as the shaft is rotating.

2. The lubrication system of claim 1, wherein the lubricant pump comprises a mechanical pump.

3. The lubrication system of claim 2, wherein the mechanical pump comprises a positive displacement pump.

4. The lubrication system of claim 1, wherein the bearing comprises a main bearing of a wind turbine and the shaft comprises a main shaft of the wind turbine.

5. The lubrication system of claim 4, wherein, as the main shaft rotates via wind, the lubricant is delivered to the main bearing via the lubricant pump.

6. The lubrication system of claim 1, wherein the bearing comprises at least one of a tapered roller bearing, a spherical roller bearing, or a cylindrical roller bearing.

7. A drivetrain assembly for a wind turbine, comprising:
a main shaft;
a main bearing comprising an inner race, an outer race, and a plurality of roller elements configured therebetween;
a lubrication system for providing lubrication to the main bearing, the lubrication system comprising:
  a seal ring positioned circumferentially around the main shaft adjacent to the main bearing;
  at least one gear arranged adjacent to and contacting the main shaft, the at least one gear being a separate component mounted directly to the seal ring;
  a lubricant pump arranged to engage the at least one gear; and,
  at least one lubricant for providing lubrication to the main bearing,
  wherein, as the main shaft rotates, the at least one gear drives the lubricant pump such that the lubricant pump continuously provides the lubricant to the main bearing so long as the main shaft is rotating.

\* \* \* \* \*